No. 782,561. PATENTED FEB. 14, 1905.
E. W. HITCHINGS.
GREENHOUSE OR OTHER STRUCTURE.
APPLICATION FILED MAY 20, 1904.

4 SHEETS—SHEET 1.

Witnesses.
F. George Barry,
Henry Thieme.

Inventor.
E. W. Hitchings
by attorneys

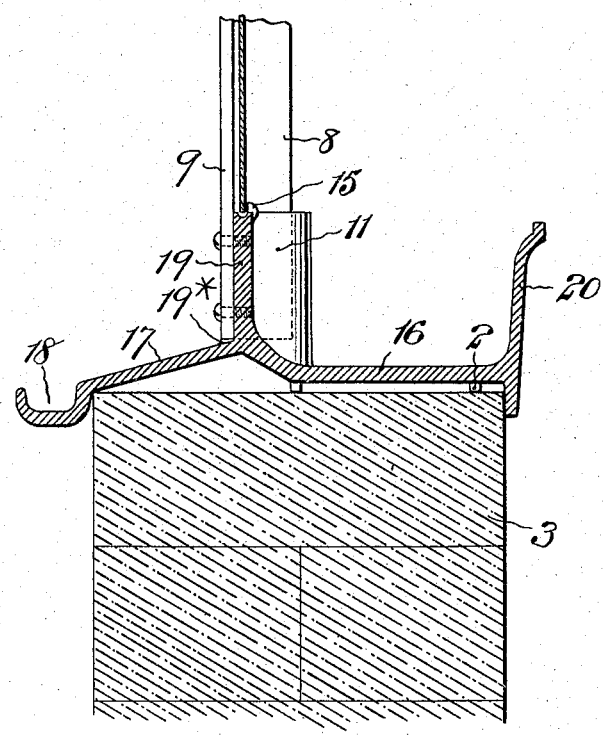
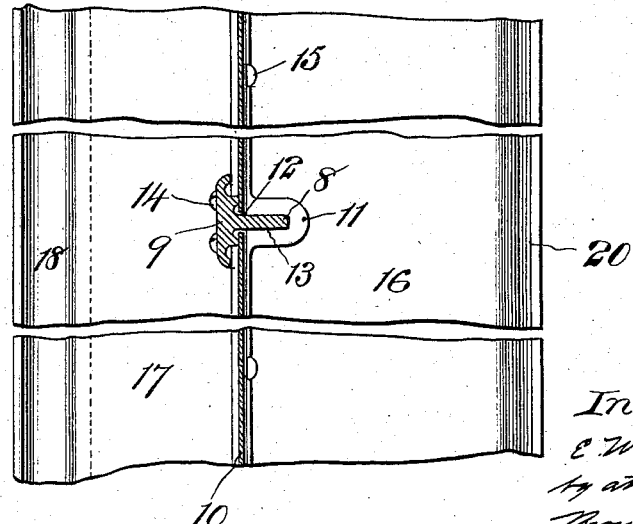

No. 782,561. PATENTED FEB. 14, 1905.
E. W. HITCHINGS.
GREENHOUSE OR OTHER STRUCTURE.
APPLICATION FILED MAY 20, 1904.

4 SHEETS—SHEET 3.

Witnesses:
F. George Barry.
Henry Thieme.

Inventor:
E. W. Hitchings
by attorneys

No. 782,561. PATENTED FEB. 14, 1905.
E. W. HITCHINGS.
GREENHOUSE OR OTHER STRUCTURE.
APPLICATION FILED MAY 20, 1904.
4 SHEETS—SHEET 4.
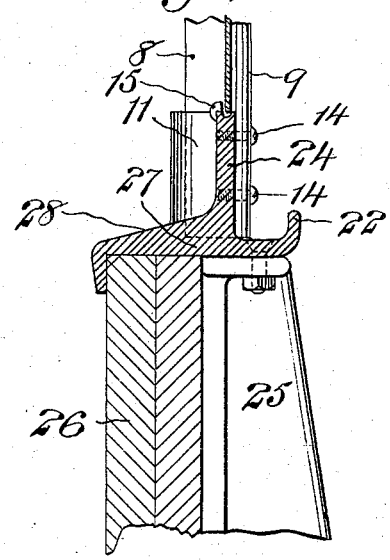
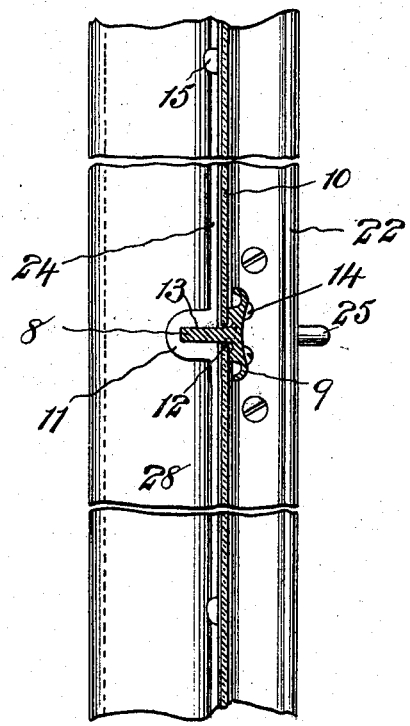

No. 782,561. Patented February 14, 1905.

UNITED STATES PATENT OFFICE.

EDWARD W. HITCHINGS, OF MONTCLAIR, NEW JERSEY.

GREENHOUSE OR OTHER STRUCTURE.

SPECIFICATION forming part of Letters Patent No. 782,561, dated February 14, 1905.

Application filed May 20, 1904. Serial No. 208,396.

*To all whom it may concern:*

Be it known that I, EDWARD W. HITCHINGS, a citizen of the United States, and a resident of Montclair, in the county of Essex and State of New Jersey, have invented a new and useful Improvement in Greenhouse or other Structures, of which the following is a specification.

My invention relates to an improvement in greenhouse or other glazed structures, and has for its object to provide certain improvements in the same whereby a very much stronger connection is established between the upright glazing-bars, which wholly or partially form the sides of the house and their support.

A further object is to provide a sill, an outside gutter, an inside gutter, and a glazing-bar socket, all formed integral, thus producing a structure which will be very strong and which will hold the upright bars against spreading and at the same time have no joints which will tend to work loose or permit the passage therethrough of the elements.

Practical embodiments of my invention are represented in the accompanying drawings, in which—

Figure 1:
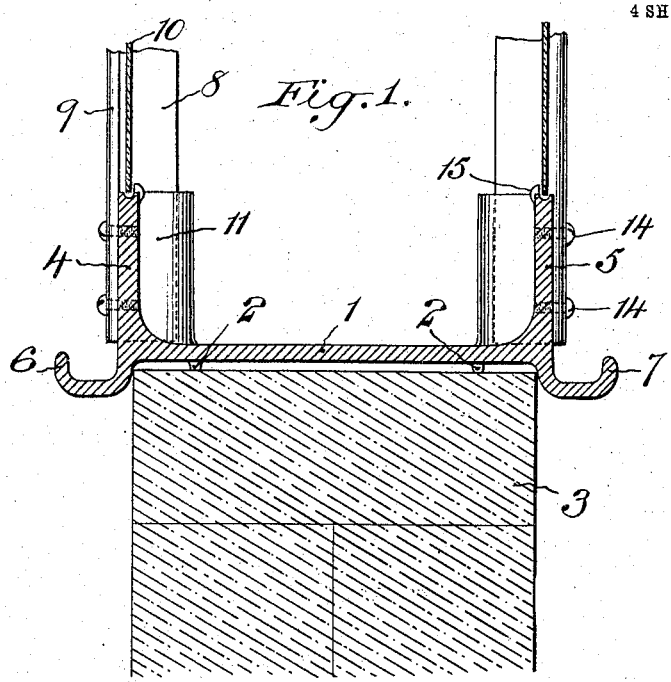
Figure 2:
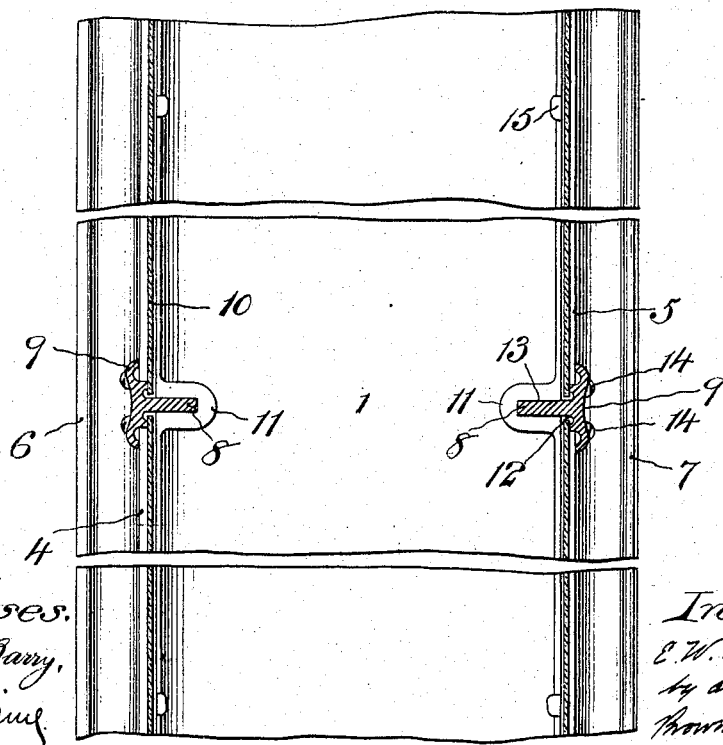
Figure 5:
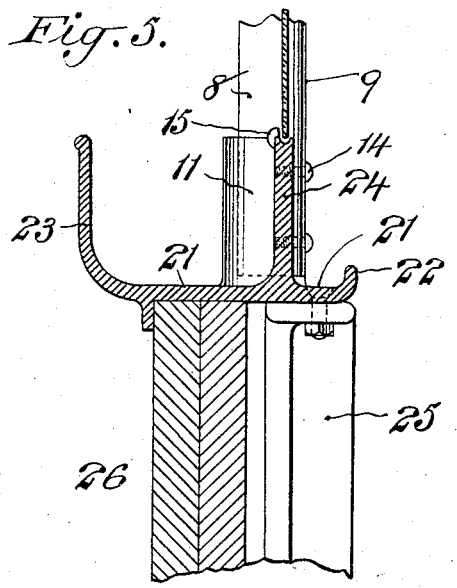
Figure 6:
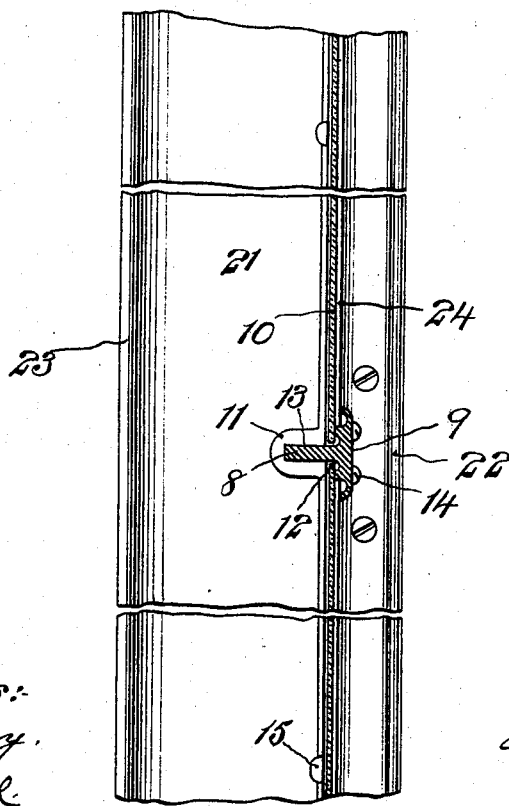

Figure 1 represents in vertical cross-section a connection between the adjacent vertical side walls of a house and a portion of the common brick wall for supporting the same. Fig. 2 is a horizontal section through the two adjacent side walls, showing the combined sill, gutters, and glazing-bar sockets in top plan. Fig. 3 is a vertical transverse section through a support for the glazed portion of a single side wall. Fig. 4 is a horizontal section through the glazed portion of the side wall, showing the support therefor in top plan. Fig. 5 is a transverse vertical section showing a modified form of support for the glazed portion of a side wall. Fig. 6 is a horizontal section through the glazed portion of the side wall, showing in top plan the support represented in Fig. 5. Fig. 7 is a vertical transverse section through the support for the glazed portion of a side wall without the outside gutter; and Fig. 8 is a horizontal section through the glazed portion of the side wall, showing in top plan the support therefor represented in Fig. 7.

The sill represented in Figs. 1 and 2 is denoted by 1, and it is provided with a plurality of spacing-lugs 2, depending from its bottom, which spacing-lugs rest upon the top of a brick or cement side wall 3. At the opposite sides of the sill 1 I provide uprights 4 and 5, extending longitudinally of the sill, between which uprights there is formed the outside gutter, arranged to receive therein the water which drops between two adjacent side walls—as, for instance, between the side walls of two adjoining structures. Longitudinal uprights 6 and 7 are also provided within the adjoining house structures, which form inside gutters for receiving the drip from the condensation which forms on the under sides of the roofs and insides of the walls. The upright glazing-bars are provided with webs 6 and heads 9, to which bars are secured the panes 10 of glass, which form the glazed portion of the side of the wall of the structure.

Vertical sockets 11 are cast on the outer faces of the uprights 4 and 5 in the outside gutter, which sockets are fitted to receive the webs 8 of the glazing-bars. The uprights 4 and 5 are provided with vertical slots 12, forming continuations of the recesses 13 in the sockets, so as to permit the glazing-bars to be inserted into position, with their heads 9 projecting beyond both sides of the slot 12 on the inner face of each upright. The glazing-bars may be secured to the uprights by fastening-screws 14, which pass through the heads 9 into engagement with said uprights. The bottom edges of the lower panes 10 of the glazed portions of the two side walls rest upon the upper edges of the uprights 4 and 5. One or more lugs 15 may be provided along the upper edges of the uprights between the sockets for preventing the panes from being displaced outwardly.

The sill, the uprights, and the sockets are all formed integral, preferably of cast-iron, thus producing a very strong and rigid structure. The sockets for the glazing-bars not only strengthen the gutter structure, but also absolutely prevent the spreading of the glazing-bars without the use of additional keepers, as has heretofore been necessary. It is to be understood that these socket-pieces may be provided at the required distances apart along the uprights to suit the distances apart which the glazing-bars are spaced.

In the form shown in Figs. 3 and 4 a structure is provided for the glazed portion of a single side wall. In this form the sill is provided with a portion 16, forming the bottom of an outer gutter, and a portion 17, along the outer edge of which is provided an inside gutter 18. An upright 19 projects from a point intermediate the sides of the sill, and an upright 20 is provided along the side of the sill portion 16. The uprights 19 20 and the sill portion 16 together form the outer gutter. The same vertical glazing-bar socket 11 is provided on the outer face of the upright 19, and the other parts are quite similar to each half of the structure shown in Figs. 1 and 2. A stop 19* is provided on the sill portion 17 adjacent to the upright 19, serving as a rest for the bottom of the head 9 of the glazing-bar.

In the form shown in Figs. 5 and 6 the sill 21 is provided with an upright 22 along its inner side, an upright 23 along its outer side, and an intermediate upright 24, dividing the structure into an inside gutter and an outside gutter. In this form the vertical glazing-bar socket 11 is provided, and the other parts are quite similar to the structure shown in Figs. 1 and 2, with the exception that the sill is shown resting upon an iron support 25, sheathed along its outer side with wood 26.

In the form shown in Figs. 7 and 8 the sill 27 rests upon the iron and wood support 25 26, as in Figs. 5 and 6. This sill is provided with an upright 22 along its inner side and an intermediate upright 24; but it does not have an upright along its outer side. In this form the top of the outer portion of the sill 27 is inclined downwardly, as shown at 28, for directing the water which may fall upon the same downwardly to some suitable gutter. (Not shown herein.) A vertical glazing-bar socket 11 is here shown as cast upon the outer face of the upright 24, as in the previous forms. It will also be seen that the casting which forms the sill gutters and sockets is exposed to the interior of the house and is thus kept at a sufficiently high temperature to prevent the freezing of the water in the gutters.

In the use of the term "glazing-bar socket" herein it is intended to indicate a socket which will receive a portion of the glazing-bar therein rather than merely a seat or step upon which the glazing-bar could rest and be supported.

It is evident that various other forms might be employed without departing from the spirit and scope of my invention, the gist lying in the formation of the several parts of the support for the glazed portion in a single piece for producing the results hereinbefore specified. Hence I do not wish to limit myself strictly to the structures herein set forth; but

What I claim as my invention is—

1. In a glazed structure, a sill and a glazing-bar socket formed integral.
2. In a glazed structure, a sill and a vertical glazing-bar socket formed integral.
3. In a glazed structure, a sill, an inside gutter and a glazing-bar socket formed integral.
4. In a glazed structure, a sill, an inside gutter and a vertical glazing-bar socket formed integral.
5. In a glazed structure, a sill, an outside gutter and a glazing-bar socket formed integral.
6. In a glazed structure, a sill, an outside gutter and a vertical glazing-bar socket formed integral.
7. In a glazed structure, a sill, an inside gutter, an outside gutter and a glazing-bar socket formed integral.
8. In a glazed structure, a sill, an inside gutter, an outside gutter and a vertical glazing-bar socket formed integral.
9. In a glazed structure, a sill, an upright forming the wall of a gutter and a glazing-bar socket formed integral therewith.
10. In a glazed structure, a sill, an upright forming a wall of a gutter and a vertical glazing-bar socket formed upon the outer face of the upright.
11. In a glazed structure, a sill, an upright forming a wall of a gutter and a vertical glazing-bar socket formed integral with the sill and upright and a slot in the upright for permitting the insertion of a portion of the glazing-bar into the socket.
12. In a glazed structure, a sill, an upright forming a common wall for an inside gutter and an outside gutter and a vertical glazing-bar socket formed integral.
13. In a glazed structure, a sill, an outside gutter and inside gutters formed integral and glazing-bar sockets cast on the uprights which form the side walls of the outside gutter.
14. In a glazed structure, a sill, an outside gutter, and inside gutters formed integral and vertical glazing-bar sockets cast on the uprights which form the walls of the outside gutter.
15. In a glazed structure, a sill, an outside gutter, an inside gutter and a socket for receiving the web of a glazing-bar, all formed integral.
16. In a glazed structure, a sill, an outside gutter, an inside gutter and a vertical socket for receiving the web of a vertical glazing-bar, all formed integral.

In testimony that I claim the foregoing as my invention I have signed my name, in presence of two witnesses, this 3d day of May, 1904.

EDW. W. HITCHINGS.

Witnesses:
 FREDK. HAYNES,
 C. S. SUNDGREN.